United States Patent [19]

Hattori et al.

[11] Patent Number: 4,632,082

[45] Date of Patent: Dec. 30, 1986

[54] DEVICE FOR DRIVING A ROTARY VALVE

[75] Inventors: Kyo Hattori, Toyota; Kazuhiro Sakurai, Gotenba, both of Japan

[73] Assignee: Toyota Jidosha Kabushiki Kaisha, Aichi, Japan

[21] Appl. No.: 803,790

[22] Filed: Dec. 2, 1985

Related U.S. Application Data

[63] Continuation of Ser. No. 649,607, Sep. 12, 1984, abandoned.

[51] Int. Cl.⁴ .............................................. F02D 9/16
[52] U.S. Cl. ...................................... 123/325; 74/108; 123/336; 137/595; 251/228
[58] Field of Search ................ 123/325, 336; 137/595, 137/601; 251/228, 229, 279, 305; 74/108, 581; 403/210, 71, 141

[56] References Cited

U.S. PATENT DOCUMENTS

| | | | |
|---|---|---|---|
| Re. 15,869 | 7/1924 | Hodges | 123/336 X |
| 1,927,617 | 9/1933 | Schmidt | 74/581 X |
| 3,143,333 | 8/1964 | Lift | 251/305 X |
| 3,698,429 | 10/1972 | Lowe et al. | 137/601 |
| 4,256,143 | 3/1981 | Magill et al. | 137/601 |
| 4,308,837 | 1/1982 | Nohira et al. | 123/336 X |
| 4,367,658 | 1/1983 | Rochelt | 74/581 |
| 4,462,355 | 7/1984 | Ozaki et al. | 123/325 |

FOREIGN PATENT DOCUMENTS

| | | | |
|---|---|---|---|
| 1277094 | 10/1961 | France | 137/601 |
| 2266064 | 3/1974 | France | 403/141 |
| 350268 | 1/1961 | Switzerland | 137/601 |

*Primary Examiner*—Martin P. Schwadron
*Assistant Examiner*—Stephen M. Hepperk
*Attorney, Agent, or Firm*—Parkhurst & Oliff

[57] ABSTRACT

A device molding a link member interconnecting an actuator to arms fixed onto valve shafts of rotary valves arranged in gas passages. The link member includes a control rod connected to the actuator and a plurality of plate springs which extend from the control rod and are outwardly bent. The outer ends of the plate springs are pivotally connected to the tips of corresponding arms.

17 Claims, 11 Drawing Figures

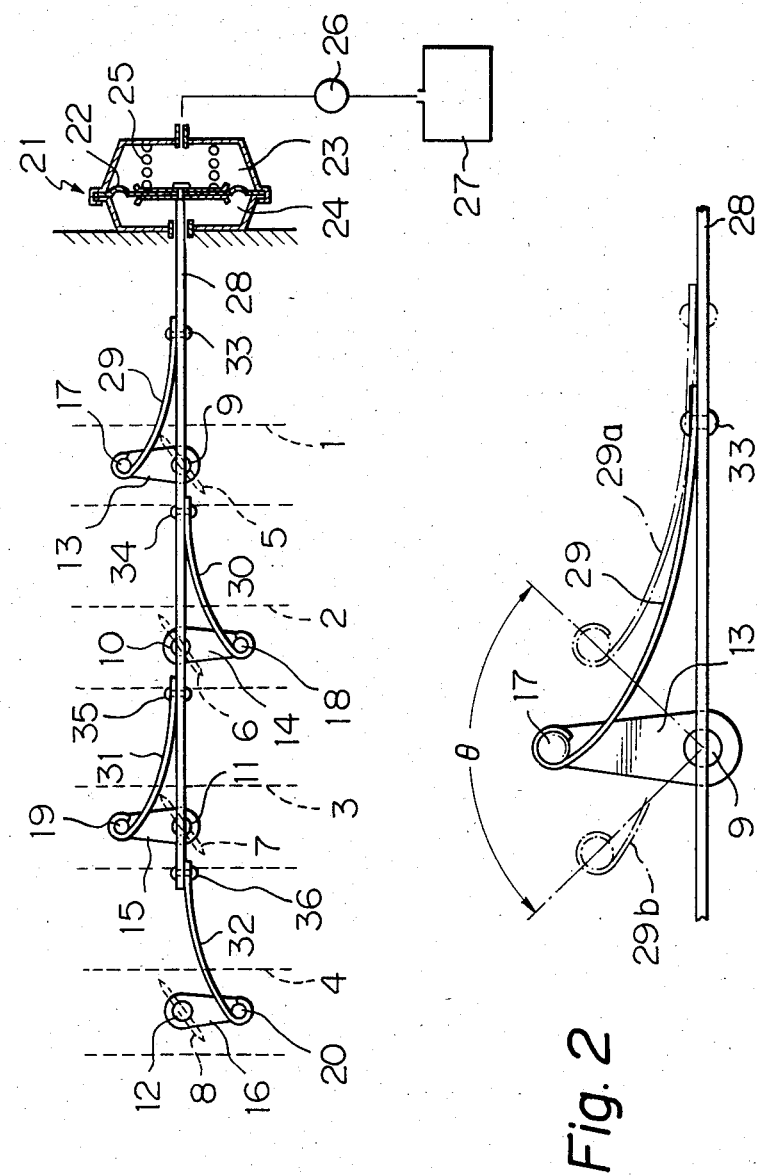

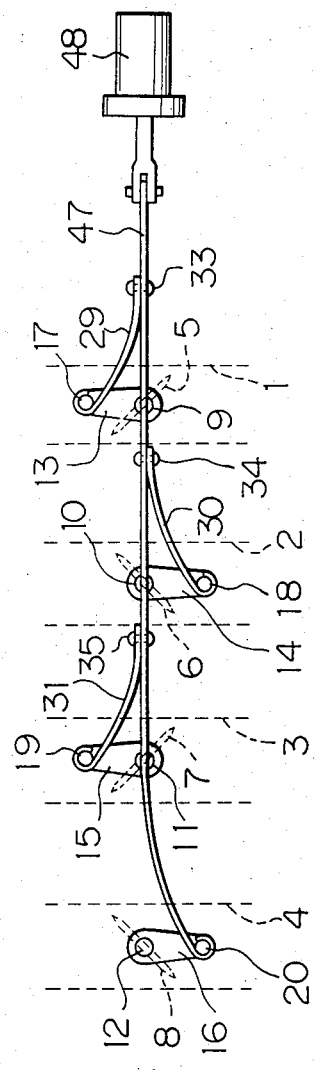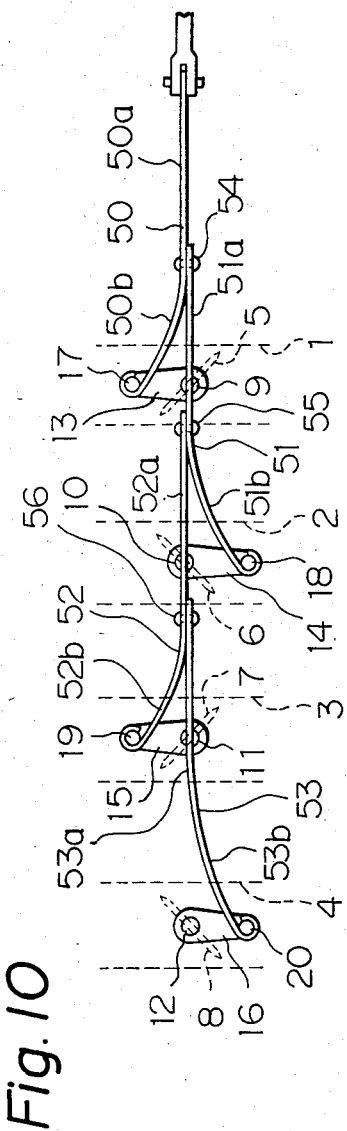

DEVICE FOR DRIVING A ROTARY VALVE

This is a continuation of application Ser. No. 649,607, filed Sept. 12, 1984, now abandoned.

BACKGROUND OF THE INVENTION

1. Field of the Invention

The present invention relates to a device for driving a rotary valve.

2. Description of the Prior Art

In a prior art rotary valve, as disclosed in, for example, Japanese Unexamined Patent Publication (Kokai) No. 57-176320, rotation control is carried out by a linearly movable drive shaft. An arm is normally fixed onto the valve shaft of the rotary valve, and the tip of the arm and the drive shaft are interconnected by means of a link member. One end of the link member is pivotally connected to the tip of the arm via a pivot pin. The other end of the link member is pivotally connected to the drive shaft via another pivot pin.

Use of such pivot pins, however, is disadvantageous in that the connecting portion between the link member and the tip of the arm and the connecting portion between the link member and the drive shaft loosen when the rotary valve is used for a long time. In addition, when a large number of rotary valves are to be controlled, the number of the pivotally connecting portions increases and, thus, the construction of the link mechanism becomes complicated.

SUMMARY OF THE INVENTION

An object of the present invention is to provide a rotary valve drive device which is capable of preventing the link mechanism from loosening over long use of the rotary valve and which has a simple construction enabling easy assembly.

According to the present invention, there is provided a rotary valve device comprising: a plurality of gas passages; a plurality of rotary valves arranged in the gas passages and aligned in a straight line, each of the rotary valves having valve shaft; a plurality of arms fixed onto the valve shafts, each of the arms having a tip; an actuator for controlling the opening operation of the rotary valves; and link means interconnecting the actuator to the tips of the arms and comprising a linearly movable straight portion, which extends straight along the straight line and is connected to the actuator, and a plurality of outwardly bending portions which have resiliency and obliquely outwardly extend from the straight portion, each of the bending portions having an outer end pivotally connected to the tip of a corresponding arm.

BRIEF DESCRIPTION OF THE DRAWINGS

The present invention will be more fully understood from the description of preferred embodiments of the invention set forth below, together with the accompanying drawings, in which:

FIG. 1 is a plan view of a first embodiment of a rotary valve drive device according to the present invention;

FIG. 2 is an enlarged view of a portion of the rotary valve drive device illustrated in FIG. 1;

FIG. 9 is a plan view of a sixth embodiment according to the present invention;

FIG. 10 is a plan view of a seventh embodiment according to the present invention.

DESCRIPTION OF THE PREFERRED EMBODIMENTS

Figure 3:
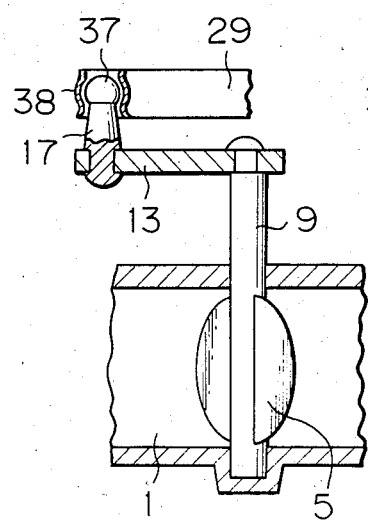
FIG. 3 is a cross-sectional side view of FIG. 2.

Referring to FIG. 1, reference numerals 1, 2, 3, and 4 designate gas passages; 5, 6, 7, and 8 rotary valves respectively arranged in the gas passages 1, 2, 3, and 4 and shaped in the form of butterfly valves; 9, 10, 11, and 12 valve shafts of the respective rotary valves 5, 6, 7, and 8; 13, 14, 15, and 16 arms fixed onto the end portions of the corresponding valve shafts 9, 10, 11, and 12; 17, 18, 19, and 20 pins respectively fixed onto the tips of the arms 13, 14, 15, and 16; and 21 an actuator. The valve shafts 9, 10, 11, and 12 are arranged in a straight line.

The actuator 21 comprises a vacuum chamber 23 and an atmospheric pressure chamber 24, separated by a diaphragm 22. A compression spring 25 for biasing the diaphragm 22 is inserted into the vacuum chamber 23. The vacuum chamber 23 is selectively connected to the outside air or a vacuum source 27 via a control valve 26.

One end of a control rod 28 is fixed onto the diaphragm 22. This control rod 28 linearly extends above the valve shafts 9, 10, 11, and 12. The ends of plate springs 29, 30, 31, and 32 which are slightly bent are rigidly fixed onto the control rod 28 by means of screws or rivets 33, 34, 35, and 36. The other ends of the plate springs 29, 30, 31, and 32 are respectively cylindrically wound and rotatably fitted onto the pins 17, 18, 19, and 20.

The pins 17, 18, 19, and 20 have the same shape, and the plate springs 29, 30, 31, and 32 have the same shape. Consequently, the constructions of only the pin 17 and the plate spring 29 of the rotary valve 5 will be hereinafter described.

Referring to FIGS. 2 and 3, a lower end of the pin 17 is fixed onto the tip of the arm 13. A head 37 of the pin 17 is shaped in the form of a sphere. As mentioned above, the plate spring 29 has a hollow cylindrical tip portion 38. The inner wall of the central portion of the hollow cylindrical tip portion 38 is shaped in the form of a partial sphere which is able to receive the spherical head 37 therein. Thus, the hollow cylindrical tip portion 38 of the plate spring 29 is fitted onto the sphere head 37 by pushing down the hollow cylindrical tip portion 38 onto the spherical head 37. If the hollow cylindrical tip portion 38 is fitted onto the spherical head 37, the hollow cylindrical tip portion 38 is held by its own resiliency by the spherical head 37. In addition, since the hollow cylindrical tip portion 38 is continuously pressed onto the spherical head 37, there is no danger that the pivotable connection between the hollow cylindrical tip portion 38 and the spherical head 37 will loosen.

Returning to FIG. 1, the arms 13 and 15 extend in a direction opposite to the arms 14 and 16 with respect to the control rod 28. Thus, the plate spring 29 and 31 are arranged on a side opposite to the plate springs 30 and 32 with respect to the control rod 28. When the vacuum chamber 23 of the actuator 21 is connected to the vacuum source 17 via the control valve 26, the diaphragm 22 moves toward the right in FIG. 1 against the compression spring 25. As a result of this, the rotary valves 5 and 7 are rotated in the clockwise direction, and the rotary valves 6 and 8 are rotated in the counter-clockwise direction. Thus, the rotary valves 5 anc 7 close the corresponding gas passages 1 and 3, and the rotary valves 6 and 8 open the corresponding gas passages 2 and 4 to the maximum extent. The position of the plate spring 29 at this time is indicated by the dash-dotted line 29a in FIG. 2.

When the vacuum chamber 23 of the actuator 21 is open to the outside air via the control valve 26, the diaphragm 22 moves toward the left in FIG. 1 due to the spring force of the compression spring 25. As a result, the rotary valves 5 and 7 are rotated in the counterclockwise direction, and the rotary valves 6 and 8 are rotated in the clockwise direction. Thus, the rotary valves 5 and 7 open the gas passages 1 and 3 to the maximum extent, and the rotary valves 6 and 8 close the gas passages 2 and 4. The position of the plate spring 29 at this time is indicated by the dash-dotted line 29b. Consequently, from FIG. 2, it will be understood that the arm 13 rotates over the angular range $\theta$ while bending the plate spring 29 outward. In the embodiment illustrated in FIG. 1, the same number of plate springs 29 and 31 and 30 and 32 are arranged on each side of the control rod 28. Therefore, it is possible to linearly move the control rod 28 without supporting the intermediate portion thereof.

Figures 4, 5:
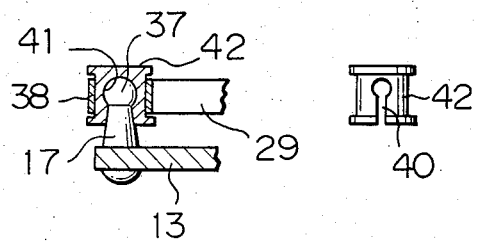
FIG. 4 is a cross-sectional side view of a portion of a second embodiment according to the present invention.
FIG. 5 is a side view of the cap illustrated in FIG. 4.
Figure 6:
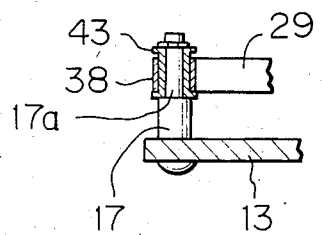
FIG. 6 is a cross-sectional side view of a portion of a third embodiment according to the present invention.

In the embodiment illustrated in FIG. 3, the hollow cylindrical tip portion 28 of the plate spring 29 is directly fitted onto the spherical head 37 of the pin 17. However, as illustrated in FIGS. 4 and 6, the hollow cylindrical tip portion 38 may be indirectly fitted onto the pin 17. That is, in a second embodiment illustrated in FIGS. 4 and 5, a cap 42 made of plastic and having a slot 40 (FIG. 5) and a spherical recess 41 (FIG. 4) is fitted onto the spherical head 37 of the pin 17, and the hollow cylindrical tip portion 38 of the plate spring 29 is fitted onto the circumferential outer wall of the cap 42. In addition, in a third embodiment illustrated in FIG. 6, the pin 17 has a reduced diameter upper end portion 172. A hollow cylindrical sleeve 43 is fitted onto the reduced diameter upper end portion 17a, and the hollow cylindrical tip portion 38 of the plate spring 29 is fitted onto the circumferential outer wall of the hollow cylindrical sleeve 43.

FIGS. 7 through 10 illustrate various embodiments. In FIGS. 7 through 10, similar components are indicated with the same reference numerals used in FIG. 1.

Figure 7:
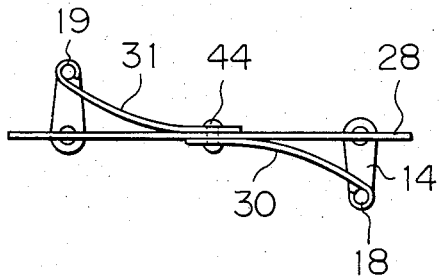
FIG. 7 is a plan view of a portion of a fourth embodiment according to the present invention.

In a fourth embodiment illustrated in FIG. 7, the inner ends of a pair of the plate springs 30 and 31 are fixed onto the control rod 28 by means of a single screw or rivet 44. Consequently, in this embodiment, it is possible to reduce the number of the screws or rivets.

Figure 8:
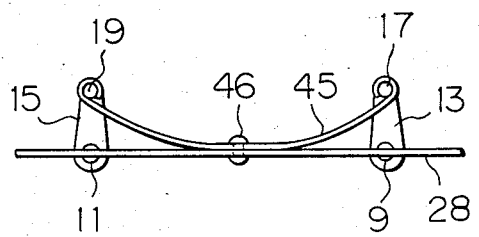
FIG. 8 is a plan view of a portion of a fifth embodiment according to the present invention.

In a fifth embodiment illustrated in FIG. 8, the middle portion of the plate spring 45 is fixed onto the control rod 28 by means of a screw or rivet 46, and the opposed ends of the plate spring 45 are connected to the pins 17 and 19 of the separate arms 13 and 15, respectively. Consequently, in this embodiment, it is possible to reduce both the number of the plate springs and the number of the screws or rivets.

In a sixth embodiment illustrated in FIG. 9, instead of using a control rod, a plate spring 47 having a long length is used. One end of the plate spring 47 is connected to the pin 20 of the rotary valve 8, and the other end of the plate spring 47 is connected to an actuator 48 formed by a solenoid. The remaining plate springs 29, 30, and 31 are fixed onto the plate spring 47 by means of the screws or rivets 33, 34, and 35. In this embodiment, there is an advantage that no control rod is necessary.

In a seventh embodiment illustrated in FIG. 10, each of plate springs 50, 51, 52, and 53 comprises straight extending portions 50a, 51a, 52a, and 53a, and bending portions 50b, 51b, 52b, and 53b, respectively. These plate springs 50, 51, 52, and 53 have the same shape. The straight extending portions 50a, 51a, 52a, and 53a of the plate springs 50, 51, 52, and 53 are arranged on the straight line, and the adjacent straight extending portions 50a, 51a, 52a, and 53a are interconnected to each other by means of screws or rivets 54, 55, and 56. Consequently, also in this embodiment, there is an advantage that no control rod is necessary. In the embodiments illustrated in FIGS. 9 and 10, all the rotary valves 5, 6, 7, and 8 open to the maximum extent at the same time and close at the same time.

Figure 11:
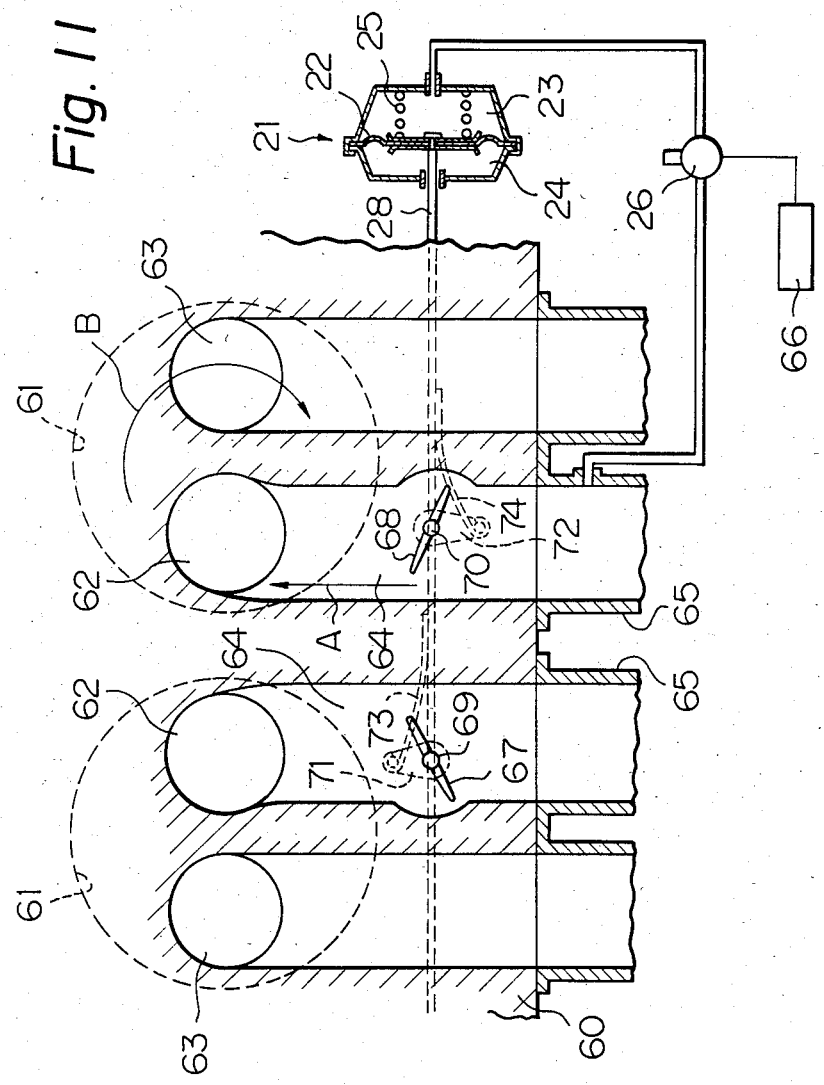
FIG. 11 is a cross-sectional plan view of an internal combustion engine.

FIG. 11 illustrates the case where the rotary valve drive device illustrated in FIG. 1 is applied to an internal combustion engine. Referring to FIG. 11, reference numeral 60 designates an engine body, 61 cylinders, 62 intake valves, 63 exhaust valves, 64 intake ports, and 65 intake pipes. The vacuum chamber 23 of the actuator 21 is connected to the interior of the intake pipe 65 via the control valve 26 actuated in response to the output signal of an engine speed sensor ora vacuum sensor 66. Intake air control valves 67 and 68 are arranged in the corresponding intake ports 64 so that the valve shafts 69 and 70 of the intake air control valves 67 and 68 are located eccentrically relative to the central axes of the intake ports. Arms 71 and 72 are fixed onto the valve shafts 69 and 70, respectively, and the tips of the arms 71 and 72 are connected to the control rod 28 via corresponding plate springs 73 and 74.

When the engine speed is lower than a predetermined speed or the level of vacuum in the intake pipe 65 is greater than a predetermined level, the vacuum chamber 23 of the actuator 21 is connected to the interior of the intake pipe 65 via the control valve 26. As a result, since vacuum acts on the vacuum chamber 23, the disphragm 22 moves toward the right in FIG. 11 and, thus, the intake air control valves 67 and 68 are rotated to the maximum closing position. At this time, the air-fuel mixture flows at a high speed along one of the side walls of the intake port 64, as illustrated by the arrow A in FIG. 11. Thus, a strong swirl motion as illustrated by the arrow B in FIG. 11 is created in the cylinder 61. As a result of this, the burning velocity of the air-fuel mixture is increased and, thus, a stable combustion can be obtained.

When the engine speed is increased beyond the predetermined speed or the level of vacuum in the intake pipe 65 becomes smaller than the predetermined level, the vacuum chamber 23 of the actuator 21 is open to the outside air via the control valve 26. As a result, since the diaphragm 22 moves toward the left in FIG. 11, the intake air control valves 67 and 68 open to the maximum extent. Thus, when the engine is operating at a high speed under a heavy load, a high volumetric efficiency can be obtained.

According to the present invention, since the hollow cylindrical tip portion of the plate spring is pressed by its resiliency onto the pin fixed onto the tip of the arm of the rotary valve, there is no danger that the connecting portion between the plate spring and the pin will loosen over long use of the rotary valve Therefore, it is possible to ensure reliable control of the rotary valve for a long time. In addition, since the construction of the rotay valve drive device is simple, it is possible to iprove the reliability of the rotary valve drive device and reduce the manufacturing cost thereof. Furthermore, since it is not necessary to support the intermediate portion of the control rod, there is an advantage that no member for supporting the control rod is necessary.

While the invntion has been described by reference to specific embodiments chosen for purposes of illustration, it should be apparent that numerous modifications could be made thereto by those skilled in the art without departing from the basic concept and scope of the invention.

We claim:

1. A rotary valve device comprising:
a plurality of gas passages;
a plurality of rotary valves arranged in said gas passages and aligned in a straight line, each of said rotary valves having a valve shaft;
a plurality of arms fixed onto said valve shafts, each of said arms having a tip;
an actuator for controlling the opening operation of said rotary valves; and
link means interconnecting said actuator to the tips of said arms and comprising a linearly movable straight portion, which extends straight along said straight line and is connected to said actuator, and a plurality of outwardly bending portions which have a resiliency and obliquely outwardly extending from said straight portion, each of said bending portions having an outer end connected to the tip of a corresponding arm
said arms comprising a first arm group and a second arm group which transversely and alternately extend in opposite directions with respect to said straight portion, said bending portions comprising a first group and a second group which transversely and alternately extend in opposite directions with respect to said straight portion.

2. A rotary valve device according to claim 1, wherein said straight portion is formed by a rigid rod, and said bending portions are formed by plate springs.

3. A rotary valve device according to claim 1, wherein said straight portion and said bending portions are formed by plate springs.

4. A rotary valve device according to claim 3, wherein one of said plate springs is provided for each rotary valve and has said straight portion and said bending portion, said plate springs having the same shape, said straight portions of the adjacent plate springs being interconnected.

5. A rotary valve device according to claim 3, wherein one of said plate springs is provided for each rotary valve and comprises a long plate spring and at least one short plate spring which is shorter than said long plate spring, said long plate spring having said straight portion and said bending portion, said short spring having only said bending portion connected to said straight portion of said long plate spring.

6. A rotary valve device according to claim 1, wherein said bending portions extend along said straight portion in the same direction.

7. A rotary valve device according to claim 6, wherein each of said bending portions is independently fixed onto said straight portion by fixing means.

8. A rotary valve device according to claim 1, wherein said first group and said second group of said being portions extend along said straight portion in opposite directions, said bending portions of the adjacent first group and second group being fixed onto said straight portion by common fixing means.

9. A rotary valve device according to claim 1, wherein each of said arms has a pin formed on the tip of the arm, and each of said bending portions has a resilient hollow cylindrical portion formed on the outer end of the bending portion and fitted onto said pin.

10. A rotary valve device according to claim 9, wherein said pin has a spherical head, and said hollow cylindrical portion has a spherically-shaped circumferential inner wall for receiving said spherical head therein.

11. A rotary valve device according to claim 9, wherein said pin has a spherical head, and said hollow cylindrical portion is fitted onto said spherical head via a cap made of plastic.

12. A rotary valve device according to claim 11, wherein said cap has an axially extending slot and a spherical recess for receiving said spherical head therein.

13. A rotary valve device according to claim 9, wherein said pin has a reduced diameter end portion, and said hollow cylindrical portion is fitted onto said reduced diameter end portion via a hollow cylindrical sleeve.

14. A rotary valve device according to claim 1, wherein said gas passages are intake passages of an internal combustion engine.

15. A rotary valve device according to claim 14, wherein said actuator is actuated in response to an engine speed for closing said rotary valves when the engine speed is lower than a predetermined speed and for opening said rotary valves when the engine speed is higher than the predetermined speed.

16. A rotary valve device according to claim 14, wherein said actuator is actuated in response to the level of vacuum in said intake passages for closing said rotary valves when the level of vacuum is greater than a predetermined level and for opening said rotary valves when the level of vacuum is smaller than the predetermined level.

17. A rotary valve device according to claim 14, wherein said valve shafts of said rotary valves are arranged eccentrically with respect to central axes of said intake passages.

* * * * *